US007620670B2

(12) United States Patent
Tokuda et al.

(10) Patent No.: US 7,620,670 B2
(45) Date of Patent: Nov. 17, 2009

(54) STORAGE SYSTEM

(75) Inventors: Seisuke Tokuda, Kokubunji (JP); Takaki Nakamura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/919,442

(22) Filed: Aug. 17, 2004

(65) Prior Publication Data
US 2005/0278398 A1   Dec. 15, 2005

(30) Foreign Application Priority Data
Jun. 15, 2004  (JP) ............................. 2004-177482

(51) Int. Cl.
*G06F 12/00* (2006.01)
*G06F 17/30* (2006.01)
*G06F 13/00* (2006.01)

(52) U.S. Cl. ...................... 707/205; 711/100
(58) Field of Classification Search ................ 707/205, 707/100
See application file for complete search history.

(56) References Cited

U.S. PATENT DOCUMENTS

| | | | |
|---|---|---|---|
| 5,333,311 A | 7/1994 | Whipple, II | |
| 5,440,737 A | 8/1995 | Uchinuma | |
| 5,675,791 A | 10/1997 | Bhide et al. | |
| 5,701,438 A | 12/1997 | Bains | |
| 5,918,229 A * | 6/1999 | Davis et al. | 707/10 |
| 6,032,224 A * | 2/2000 | Blumenau | 711/117 |
| 6,389,432 B1 * | 5/2002 | Pothapragada et al. | 707/205 |
| 6,889,285 B2 * | 5/2005 | Dawson et al. | 711/4 |
| 6,925,529 B2 | 8/2005 | Bohrer et al. | |
| 7,010,532 B1 * | 3/2006 | Stakutis et al. | 707/10 |
| 7,054,790 B1 * | 5/2006 | Rich | 702/186 |
| 7,236,992 B2 * | 6/2007 | Yano et al. | 707/203 |
| 2004/0024796 A1 | 2/2004 | Takeda et al. | |
| 2004/0153479 A1 * | 8/2004 | Mikesell et al. | 707/200 |
| 2004/0205258 A1 * | 10/2004 | Wilson et al. | 710/1 |
| 2007/0174580 A1 * | 7/2007 | Shulga | 711/170 |

FOREIGN PATENT DOCUMENTS

JP        2004-70403        3/2004

* cited by examiner

*Primary Examiner*—John R. Cottingham
*Assistant Examiner*—Kimberly Lovel
(74) *Attorney, Agent, or Firm*—Antonelli, Terry, Stout & Kraus, LLP.

(57) ABSTRACT

At least two devices having different characteristics are provided as one file system, and the file system stores a file in a device according to the file purpose. In file system operation, a device characteristic acquiring unit acquires characteristic information of the respective devices by using a device characteristic database, a device characteristic acquiring interface, and stores the information in the device characteristic holding. In file operation for preparing file management information in file storing process, a file purpose interpreting unit interprets the purpose and attribute of the file and registers a characteristic flag representing the characteristic of the file in the file management information. In file operation for actually writing a file, a storage device decision unit decides a file storage location device on the characteristic flag in the file management information and information of the device characteristic holding unit to perform a device free region securing process.

8 Claims, 8 Drawing Sheets

| DEVICE CHARACTERISTIC INFORMATION \ DEVICE | DEVICE 1 | DEVICE 2 | DEVICE 3 |
|---|---|---|---|
| WORM | N | N | Y |
| RANDOM ACCESS | Y | N | N |
| SEQUENTIAL ACCESS | N | Y | N |
| THROUGHPUT PERFORMANCE (MB/s) | 50 | 70 | 30 |

FIG. 4

| DEVICE CHARACTERISTIC INFORMATION \ VENDER/MODEL | VENDER 1 MODEL 1 | VENDER 1 MODEL 2 | VENDER 2 MODEL 1 |
|---|---|---|---|
| WORM | N | Y | N |
| RANDOM ACCESS | N | N | Y |
| SEQUENTIAL ACCESS | Y | N | N |
| THROUGHPUT PERFORMANCE (MB/s) | 50 | 70 | 30 |

STORAGE SYSTEM

CROSS-REFERENCE TO RELATED APPLICATION

The present application claims priority from Japanese Patent Application No. JP 2004-177482 filed on Jun. 15, 2004, the content of which is hereby incorporated by reference into this application.

TECHNICAL FIELD OF THE INVENTION

The present invention relates to a file storage technique in a storage system and, more particularly, to an effective technique applied to storage of a file in an optimum device according to the purpose of the file.

BACKGROUND OF THE INVENTION

In many computer systems, data are stored and fetched for respective files. This is realized such that a file system partially constituting an operating system (OS) abstracts a storage device to perform a data storing process and a data loading process.

Figure 8:
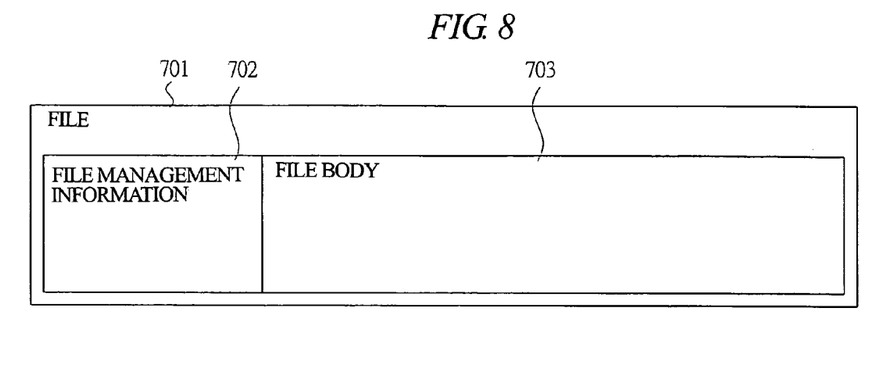
FIG. 8 is a diagram for explaining the structure of a general file handled by a file system of a computer system.

FIG. 8 is a diagram showing the structure of a general file handled by the file system.

A file 701 comprises a file body 703 and an i-node 702 which is management information of the file body 703. The i-node includes pieces of information such as identification information of a device serving as an actual storage medium, position information related to a file storage device, a file name including an extension of a file, and a file size.

Figure 9:
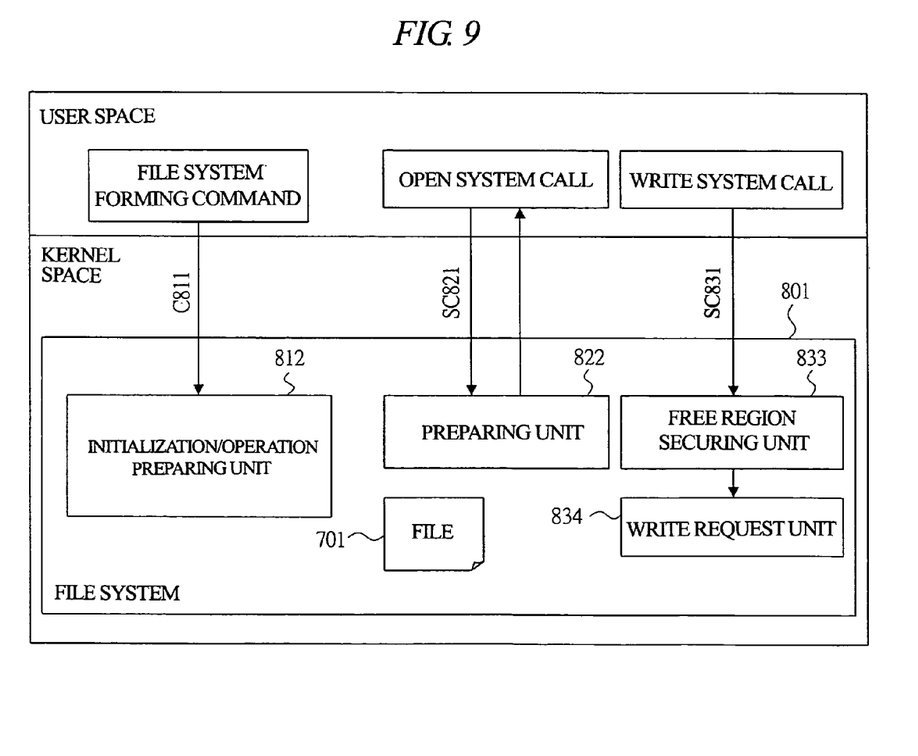
FIG. 9 is a block diagram showing a file system forming process and file storing process in an operating system.

A process of forming a file system which handles the file 701 and a process of storing the file 701 by the file system will be described below with reference to FIG. 9.

The process of forming a file system will be described first.

When a file system forming command C811 is executed in a user space, an initialization/operation preparing unit 812 performs, in a kernel space, initialization and operation preparation for a file system control block of a device serving as file system formation target to form a file system 801.

The file storing process will be described next.

The storing process comprises two-step processes including preparation of an i-node serving as file management information and actual writing of a file. When an open system call SC821 is issued as the first step process, a preparing unit 822 prepares a file i-node in the file system 801 in the kernel space. The preparing unit 822 returns a file descriptor FS1 associated with the file i-node to the user space.

As the second-step process, a write system call CS831 is issued from the user space by using a file descriptor as an argument which is a return value of the above open system call.

At this time, a free region securing unit 833 refers to the i-node in the file system 801 in the kernel space through the file descriptor FS2 to secure a free region of the device, and outputs an actual write request to a write request unit 834. With the above two-step processes, file storage is performed.

US Patent Application Publication No. 2004/0024796 describes a technique which selects a proper device for each type of a business applications of generating a file and stores the file.

SUMMARY OF THE INVENTION

In the above computer system, however, the following problems are found by the present inventors.

In recent years, a storage system to perform data storage processes various types of files, e.g., a text file such as an E-mail, an electronic document file, a large-size output file obtained by scientific and technological calculation, a database file, and the like. The device to store files has had various characteristics according to the applications of files.

For example, as the characteristics, characteristic features for WORM restricted by the law, high-speed file access (random or sequential), synchronous copy handling data which requires continuation of business, a relatively inexpensive device which performs external connection, and the like are known.

Figure 10:
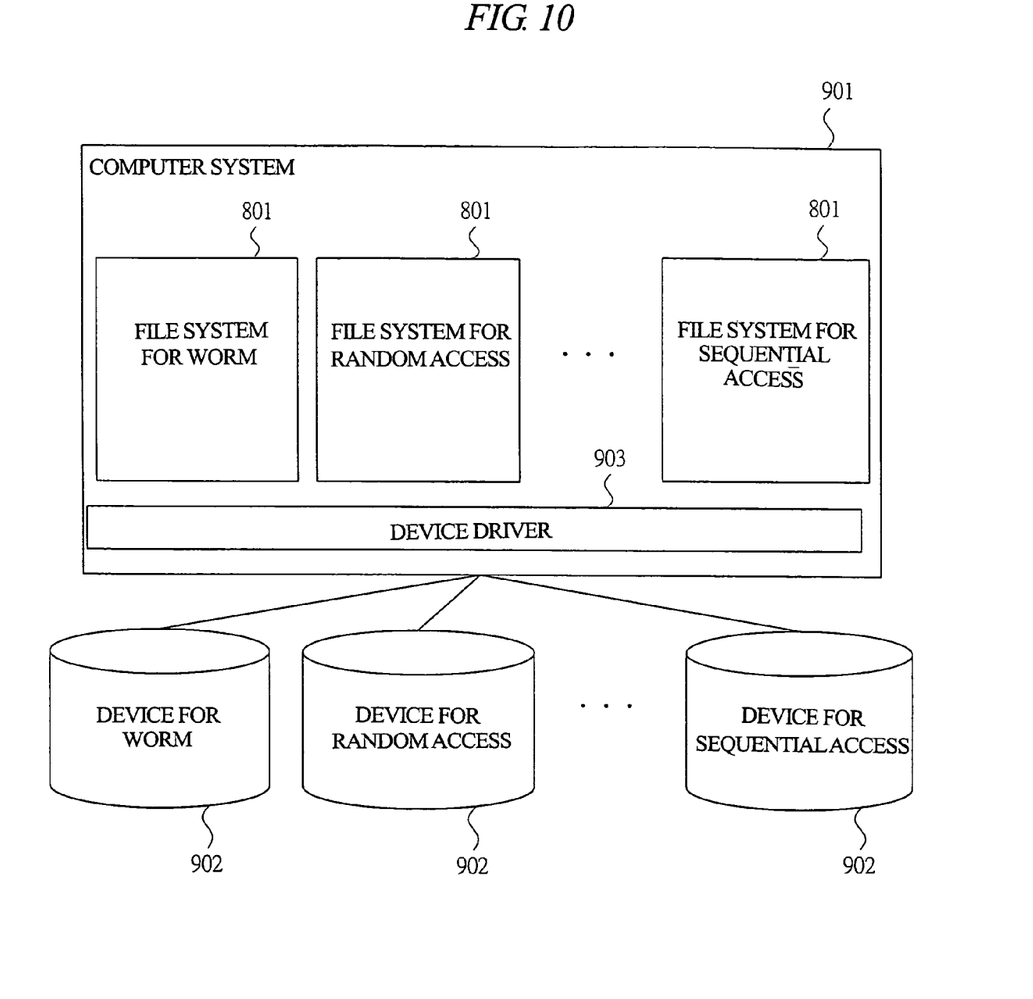
FIG. 10 is a diagram for explaining an operation form obtained when devices having different characteristics are used in the operating system in FIG. 9.

Therefore, when a plurality of files are stored, as shown in FIG. 10, a computer system 901 had been operated by a configuration in which file systems 801 are formed one by one for different devices 902 having characteristics according to the purposes of the files. At this time, a device driver 903 issues requests from each of the file systems to the corresponding devices.

In the operation performed by the configuration, a user must troublesomely selects a file system 801 according to a file purpose and store the file. That is, an increase in data management cost is raised as a problem.

According to the technique described in US Patent Application Publication No. 2004/0024796, although a user saves the trouble of selecting a device in which a file is stored, the device is selected depending on the type of a business application. Therefore, the technique may not be good enough to select a storage location device having a characteristic feature suitable for the purpose of each file.

It is an object of the present invention to provide a technique which provides a plurality of devices having different characteristics as one file system (mount point) and which causes the file system to store a file in an optimum device according to a file purpose, without making a user to be conscious of the storage, to reduce data management cost.

The above and other objects and novel characteristics will be apparent from the description of the specification and the accompanying drawings.

Of the aspects of the invention to be disclosed in this application, typical aspects will be briefly described below.

The present invention provides a storage system including a plurality of devices having different characteristics, a device driver which operates the plurality of devices, and one file system or a plurality of file systems constituted by at least two devices of the plurality of devices, wherein the file system includes a device characteristic acquiring unit which acquires the characteristics of the respective devices in a file system operation such as formation, extension, and mounting of the file system, and a device characteristic holding unit which stores the characteristics of the respective devices obtained by the device characteristic acquiring unit.

The file system includes a file purpose interpreting unit which interprets the purpose and attribute of a file and registers the characteristic in the file management information as a characteristic flag in a file operation for preparing file management information of a file storing process, and a storage device decision unit which decides and determines a device for storing the file on the basis of the characteristic flag of the file management information and the information in the device characteristic holding unit in a file operation for actually writing the file of a file storing process.

The contents of the invention of the application will be further described below in detail.

The present invention adds a new process in the file system operation such as formation, extension, and mounting of a file system and the file storing process. More specifically, as the new process, characteristics of devices are acquired, determined and stored in the file system operation.

As the acquiring and determining methods, the device characteristics are acquired and determined by (1) characteristic acquisition by a device driver, (2) characteristic acquisition by inquiring at a database registered in advance about the characteristic of a general-purpose device, (3) characteristic determination by control change designation such as a RAID (Redundant Array of Inexpensive Disks) cache for a designated device characteristic, (4) device characteristic evaluation by measurement, and the like.

The method (1) is performed to a device having registered device characteristic information which can be acquired by a device driver. The method (3) is performed when devices are logical devices in a RAID apparatus recognized by an OS and control of RAID caches and the like can be changed in units of devices. When devices do not correspond to the devices in the methods (1) to (3), several types of access pattern requests are performed by the method (4), and the response times are measured to determine device characteristics.

A new process in the file storing process interprets the purpose and attribute of a file and registers a characteristic flag representing the characteristic of the file in file management information as an extension attribute in a file operation for preparing file management information. Subsequently, in a file operation for actually writing the file, a file storage location device is decided on the basis of the characteristic flag in the file management information and the held device characteristic.

Effects obtained by the typical aspects of the invention to be disclosed in this application will be briefly described below.

File storage can be performed depending on a purpose without making a user to be conscious of the storage to make it possible to reduce a management cost.

DESCRIPTION OF THE PREFERRED EMBODIMENTS

Embodiments of the present invention will be described below with reference to the accompanying drawings. The same reference numerals as in all the drawings used for describing the embodiments denote the same parts in the drawings in principle, and repetitive explanations will be omitted.

Figure 1:
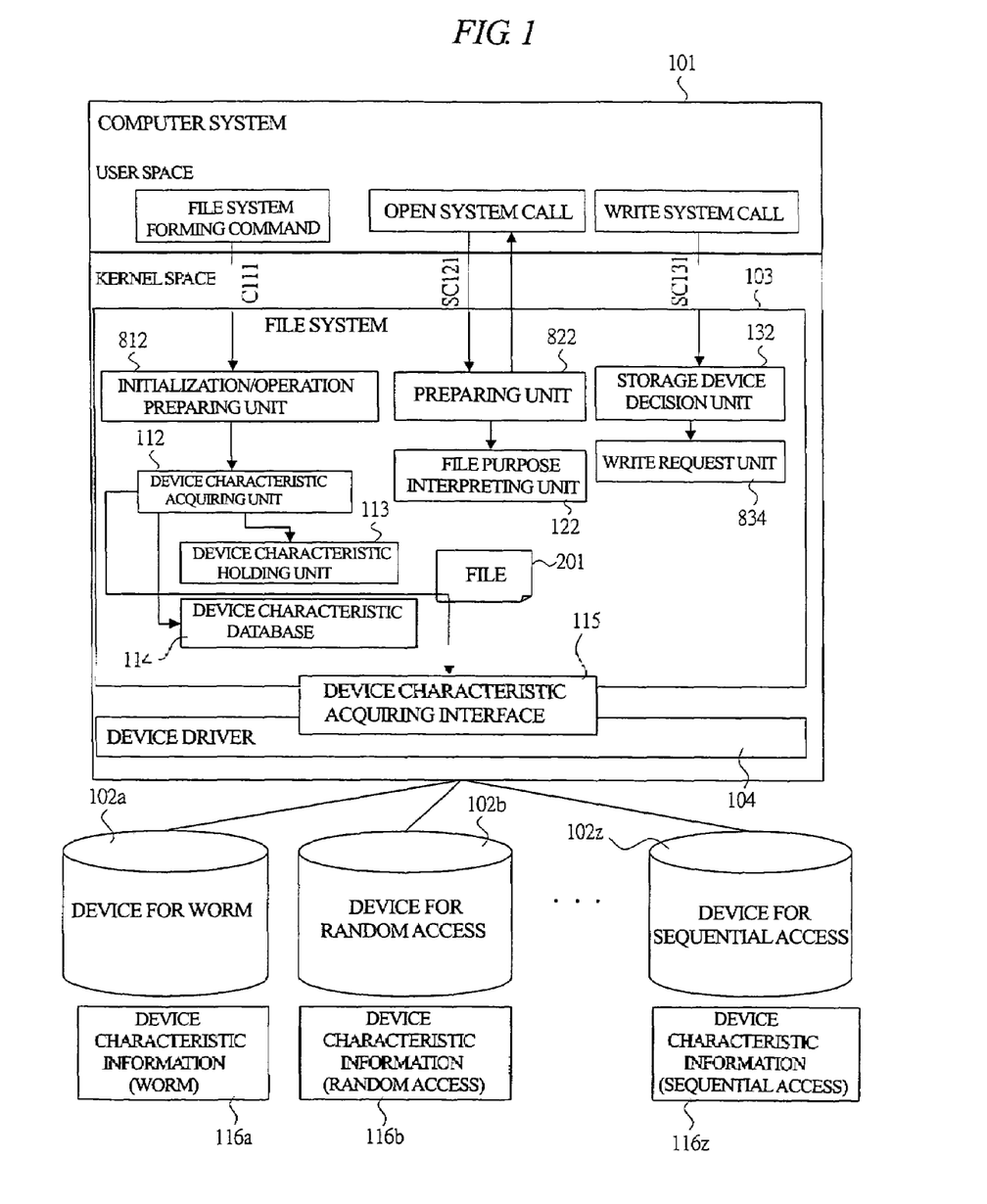
FIG. 1 is a block diagram showing the configuration of a storage system according to an embodiment of the present invention.
Figure 2:
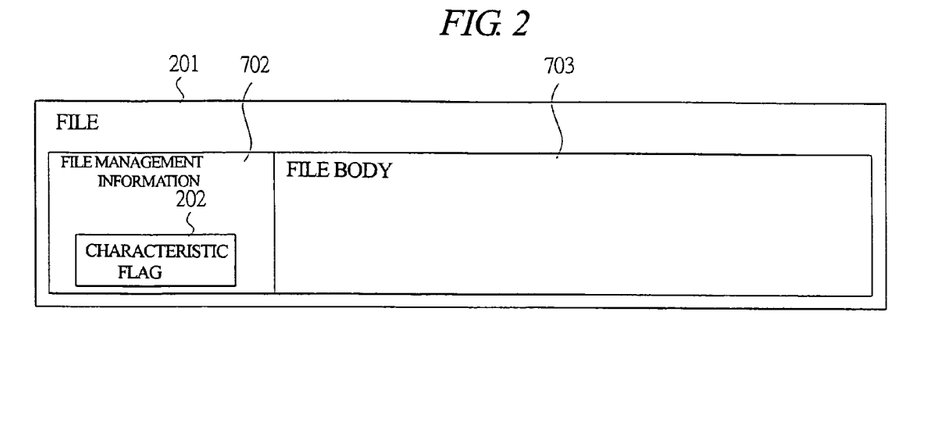
FIG. 2 is a diagram for explaining the structure of a file handled by a file system of the storage system in FIG. 1.
Figure 3:
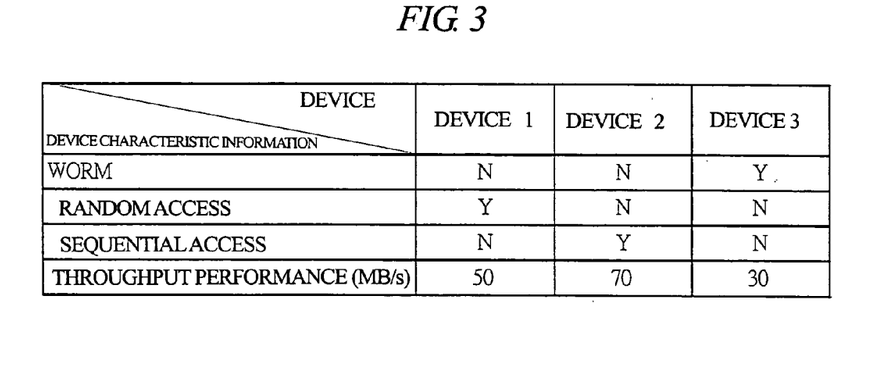
FIG. 3 is a diagram for explaining an example of the configuration of a device characteristic holding unit arranged in the storage system in FIG. 1.
Figure 4:
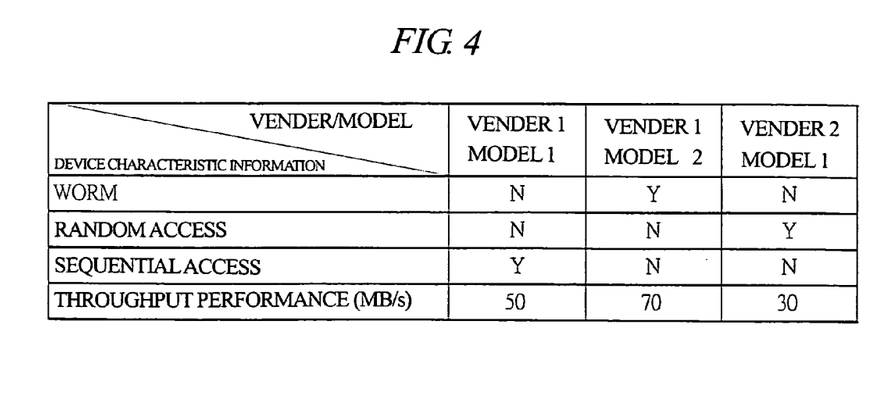
FIG. 4 is a diagram for explaining an example of the configuration of a device characteristic database arranged in the storage system in FIG. 1.
Figure 5:
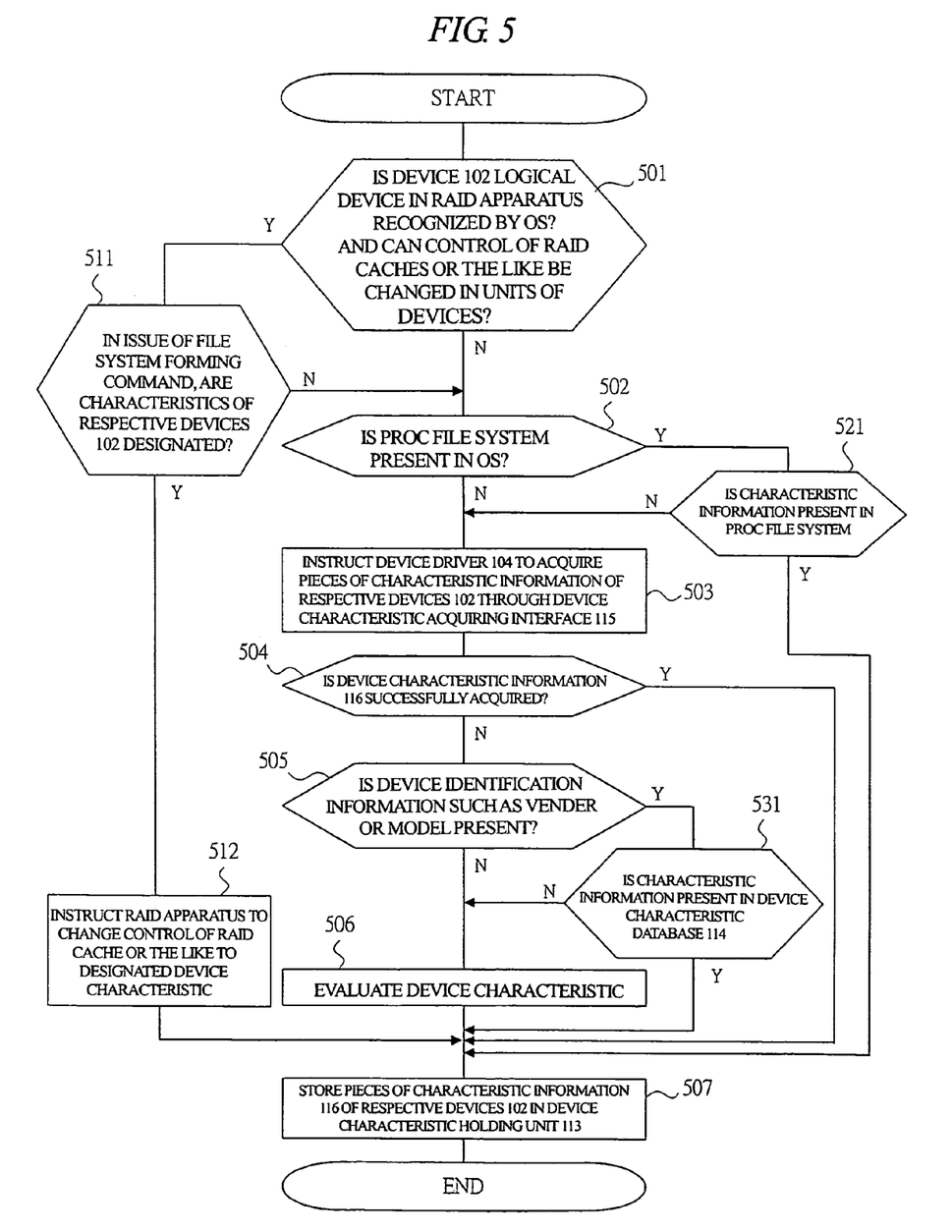
FIG. 5 is a flow chart showing processes in a device characteristic acquiring unit arranged in the storage system in FIG. 1.
Figure 6:
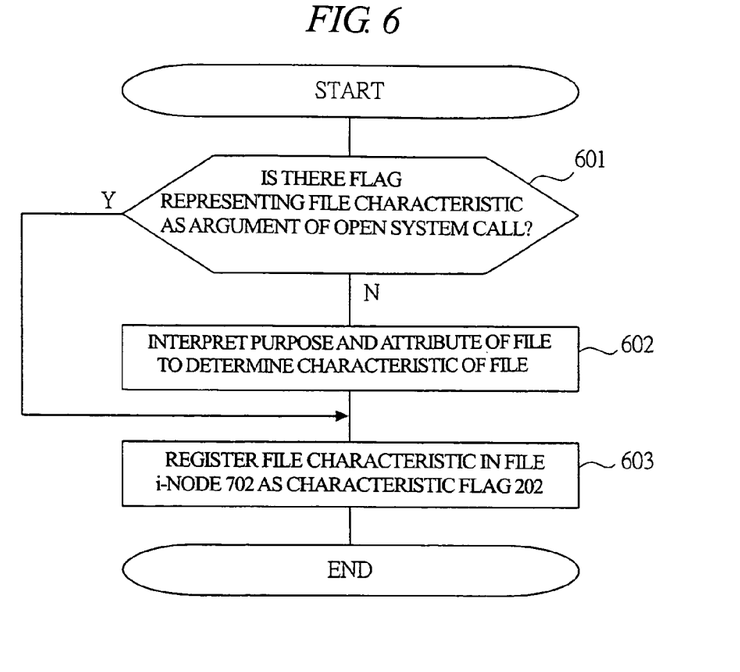
FIG. 6 is a flow chart showing a process of a file purpose interpreting unit arranged in the storage system in FIG. 1.
Figure 7:
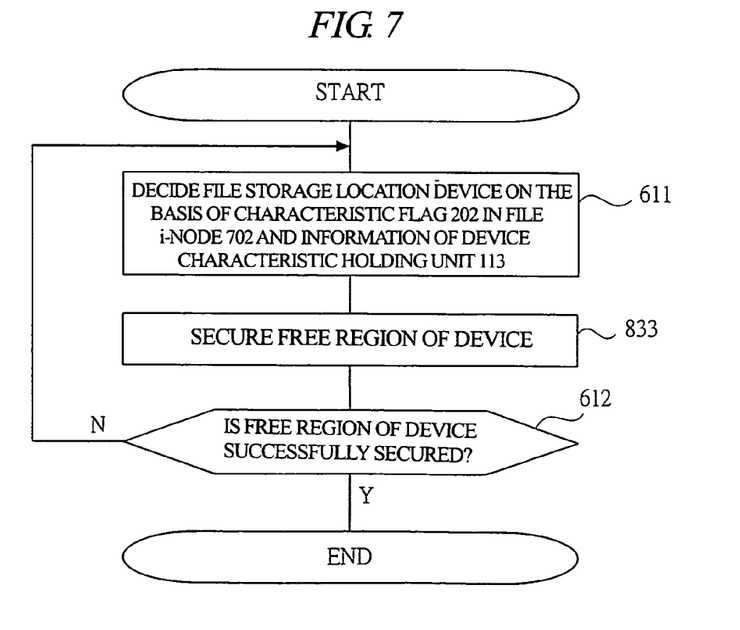
FIG. 7 is a flow chart showing a process of a storage device decision unit arranged in the storage system in FIG. 1.

FIG. 1 is a block diagram showing the configuration of a storage system according to an embodiment of the present invention, FIG. 2 is a diagram for explaining the structure of a file handled by a file system of the storage system in FIG. 1, FIG. 3 is a diagram for explaining an example of the configuration of a device characteristic holding unit arranged in the storage system in FIG. 1, FIG. 4 is a diagram for explaining an example of the configuration of a device characteristic database arranged in the storage system in FIG. 1, FIG. 5 is a flow chart showing processes in a device characteristic acquiring unit arranged in the storage system in FIG. 1, FIG. 6 is a flow chart showing a process of a file purpose interpreting unit arranged in the storage system in FIG. 1, and FIG. 7 is a flow chart showing a process of a storage device decision unit arranged in the storage system in FIG. 1.

In this embodiment, the storage system, as shown in FIG. 1, is constituted by a plurality of devices $102a$ to $102z$. The operating system of the computer system 101 is constituted by a user space and a kernel space.

In the kernel space, a file system 103 and device driver 104 operate as some of the functions of the operating system, and a device characteristic acquiring interface which sends a device characteristic acquiring request from the file system 103 to the device driver 104 is present.

The file system 103 is constituted by an initialization/operation preparing unit 812, a preparing unit 822, a write request unit 834, a device characteristic acquiring unit 112, a device characteristic holding unit 113, a device characteristic database 114, a file purpose interpreting unit 122, and a storage device decision unit 132.

The devices $102a$ to $102z$ are constituted by hard disk drives or the like, respectively, and have different characteristic information $116a$ to $116z$, respectively. The computer system 101 provides one of these devices $102a$ to $102z$ as one file system 103.

When an application program or a user issues a file system forming command C111 from the user space, the initialization/operation preparing unit 812 operates to from a file system 103. Thereafter, the device characteristic acquiring unit 112 performs a process.

In the process, the pieces of characteristic information 116 of the respective devices 102 are acquired by using the device characteristic database 114, a device characteristic acquiring interface 115, and the like, and the pieces of information are stored in the device characteristic holding unit 113. The details of the functions of the respective units will be described later.

On the first stage of the file storing process, when an open system call SC121 is issued, after a conventional process performed by an i-node preparing unit, a file purpose interpreting unit 122 operates. With this operation, a characteristic flag 202 representing a file characteristic as an extended attribute is registered in the file management information (i-node) 702 of a file 201 as shown in FIG. 2.

In issue of a write system call SC131 performed as the second stage of the file storing process, the storage device decision unit 132 including the process of a free region securing unit 833 (FIG. 9) performs a process.

After the process, a file write request unit outputs a file write request. To add the above new processes realizes a storage system which changes a storage location device according to a file purpose.

In this embodiment, one file system 103 is provided by the computer system 101. However, two ore more file systems 103 may be provided.

The operation of the device characteristic acquiring unit 112 may be performed only in formation of a file system but also in a file system operation such as file system extension or mounting. In the embodiment, the file storing process is described by using the open system call and the write system call. However, the file storing process may be described by using other file operations.

Detailed processes of the device characteristic acquiring unit 112, the file purpose interpreting unit 122, and the storage device decision unit 132 will be described below.

A process flow of the device characteristic acquiring unit 112 is shown in FIG. 5.

In the process in step 501, it is decided whether or not the devices 102 are logical devices (to be referred to as logical units hereinafter) in a RAID apparatus recognized by the OS and it is decided whether or not control of RAID caches or the like can be changed for the respective logical units.

When the conditions are not satisfied, the process is shifted to step 502. When the conditions are satisfied, it is decided in step 511 whether or not characteristics are designated for the respective devices 102 in execution of the file system forming command C111. When no characteristic is designated, the process is shifted to step 502.

When the characteristics are designated, the RAID apparatus is instructed to change control of the RAID cache or the like for a characteristic designated in step 512. The process is shifted to step 507.

In the process in step 502, it is decided whether or not the OS comprises a proc file system. When the OS does not comprise the proc file system, the process is shifted to step 503.

When the OS comprises the proc file system, it is decided in the process in step 521 whether or not the proc file system includes the pieces of characteristic information of the respective device 102. When the proc file system includes no characteristic information, the process is shifted to step 503. When the proc file system includes characteristic information, the process shifts to step 507.

In this case, the proc file system holds information to be obtained when the OS has recognized a device. For example, when the OS recognizes a SCSI device, information related to SCSI devices recognized by the OS are stored in the /proc/scsi directory.

In step 503, the device driver 104 is instructed to acquire the pieces of characteristic information of the respective devices 102 by using the device characteristic acquiring interface 115, and then the process shifts to step 504. As the device characteristic acquiring interface 115, an ioctl system call or the like is used.

In the process in step 504, the device driver 104 outputs acquisition requests of the pieces of characteristic information 116 of the respective devices 102 to decide whether or not the device driver 104 successfully acquires the pieces of characteristic information 116.

When the device driver 104 fails in the acquisition, the process shift to step 505. When the device driver 104 successfully acquires the pieces of characteristic information 116, the process shift to step 507. This successful case corresponds to a case in which the pieces of characteristic information 116 are registered in the device 102 and can be acquired by the device driver 104.

For example, when a SCSI device is used, if the pieces of characteristic information 116 are registered in a response region of an inquiry command, the device driver 104 issues an inquiry command to obtain the corresponding device characteristic information 116 as a response.

In the process in step 505, it is decided whether or not pieces of device identification information such as vender models of the respective devices 102 can be obtained. When the pieces of device identification information cannot be obtained, the process is shifted to step 506. When the pieces of device identification information can be obtained, in the process in step 531, the device characteristic database 114 is inquired by using the pieces of device identification information to decide whether or not the pieces of characteristic information of the respective devices 102 are registered.

When the pieces of characteristic information are not registered, the process is shifted to step 506. When the pieces of characteristic information are registered, the process shifts to the process in step 507. The acquisition of the device identification information in the process in step 505 is performed by using the proc file system or the like.

In step 506, a plurality of access patterns such as Read of a random access pattern and Write of a sequential access pattern are issued to the device driver 104, and the response times for the access patterns are measured to evaluate the characteristics of the respective devices 102 (device characteristic evaluation). The process shifts to the process in step 507.

In the process in step 507, the pieces of characteristic information of the respective devices 102 obtained in the above steps are stored in the device characteristic holding unit 113. The above constitute the process flow of the device characteristic acquiring unit 112.

In this process flow, when the characteristics of the respective devices 102 are designated in execution of the file system forming command C111, the process shifts to step 507 without shifting to step 502 and the subsequent steps. The designated characteristics can also be stored in the device characteristic holding unit 113.

When the devices 102 are logical units in the RAID apparatus, the pieces of characteristic information 116 may also be registered in the devices 102. Each of the logical units is constituted by a real device in one RAID apparatus or a plurality of RAID apparatuses.

Therefore, in formation of the logical unit, the characteristic information 116 is registered in the response region of a device information acquiring request obtained by the device driver. For example, the characteristic information 116 is registered in the response region of an inquiry command issued by the SCSI device driver.

When a device characteristic is designated in formation of the logical unit, the RAID apparatus registers the designated characteristic. Control of the respective logical units in the RAID apparatus can be changed, the control is changed to obtain the designated characteristic, and the characteristic is registered. When characteristic is not designated, the device control information obtained in the formation of the logical unit is registered as a characteristic.

FIG. 3 shows the device characteristic holding unit 113.

The rows of the holding unit denote pieces of device characteristic information. As the pieces of device characteristic information, pieces of information for WORM, high-speed file access, throughput performance, and the like may be used. The columns denote devices constituting file systems. The contents of the columns are indicated by device identifiers representing respective devices, ranges of block numbers of the respective devices, and the like. The pieces of characteristic information held by the respective devices are indicated by Y, and no pieces of characteristic information are indicated N.

The throughput performance is indicated by a performance value. The device characteristic holding unit 113 is stored in file system control blocks in the devices constituting the file systems and is read when the file systems are mounted, or is dynamically generated when the file systems are mounted.

FIG. 4 shows the device characteristic database 114.

The database registers pieces of characteristic information of general-purpose devices. The rows of the database denote pieces of device characteristic information as in the device characteristic holding unit 113 in FIG. 3, and the columns denote pieces of information for identifying devices such as vender model or the like.

An indication of characteristics held by the respective devices is the same as that in the device characteristic holding unit 113. In this case, the device characteristic database 114 need not be arranged in the file system when the device characteristic database 114 can be referred by the file system.

In the embodiment described above, a file system integrates a plurality of devices. In this manner, there is provided a system which manages a file under one file system regardless of the type of a file storage system. In place of the configuration, a configuration in which a means for integrating a plurality of devices in the operating system of the computer system 101 and managing the devices as a single logical device is arranged independently of the file system can also be used. A storage system having such a configuration is shown in FIG. 11.

A logical device management means 140 as some of the functions of an operating system is present in the kernel space of the computer system 101. The logical device management means 140 integrates a plurality of devices 102*a* to 102*z* having different characteristics to form one logical device. The formed logical device serves as a logical storage device of files formed and managed by a file system 103'. The file system 103' is obtained by removing the device characteristic acquiring unit 112 and the device characteristic database 114 from the file system 103. The other configuration of the file system 103' is the same as the file system shown in FIG. 1. The same reference numerals as in FIG. 1 denote the same parts in the file system 103'. On the other hand, the logical device management means 140 comprises a device characteristic acquiring unit 142. When the logical device management means 140 forms a logical device, the process of the device characteristic acquiring unit 142 is executed. In the process, pieces of characteristic information of respective devices are acquired through device drivers and stored in a management region of the logical device.

The file system 103' reads the pieces of characteristic information of the respective devices from the management region of the logical device in the file system forming process, and stores the read characteristic information in the device characteristic holding unit 113. The logical device management means 140 comprises a device characteristic database 144 which is the same as the device characteristic database 114 in FIG. 1. More specifically, the pieces of characteristic information of known general-purpose devices can be acquired from the device characteristic database 144 not from the respective devices as in FIG. 1.

Figure 11:
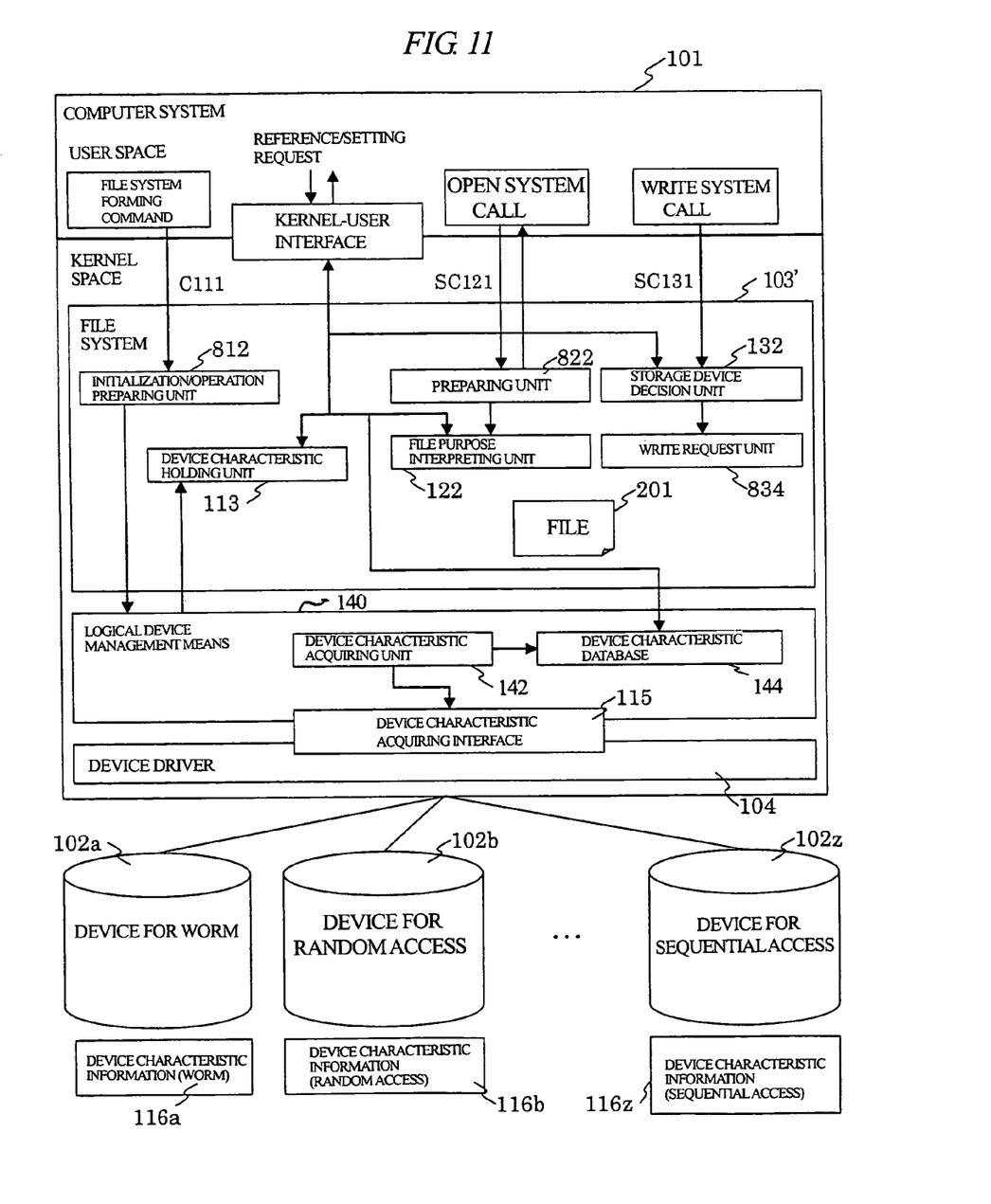
FIG. 11 is a block diagram showing the configuration of a storage system according to another embodiment which is modification of the storage system in FIG. 1.

A flow chart of processes performed by the file purpose interpreting unit 122 in FIG. 1 or FIG. 11 is shown in FIG. 6, and a flow chart of processes performed by the storage device decision unit 132 is shown in FIG. 7.

As shown in FIG. 6, in the process in step 601, it is decided whether or not a flag representing the characteristic of a file is designated as an argument in issue of an open system call SC121. When the flag is designated, the process shift to step 603. When the flag is not designated, the process shifts to the process in step 602. In this case, the characteristic of the file means the characteristic of a device in which the file is suitably stored.

In the process in step 602, the purpose and attribute of the file are interpreted to determine the characteristic of the file. The process shifts to step 603. At this time, a file extension, a file size, keyword information, or the like in the file i-node 702 is interpreted.

More specifically, in the interpreting method, when the extension of the file is ".txt" or ".doc", it is interpreted that the file has a characteristic of random access. When the extension is ".eml", it is interpreted that the file has a characteristic of WORM. When the file size is larger than a predetermined threshold value, it is interpreted that the file has a characteristic of sequential access. When the file size is smaller than the predetermined threshold value, it is interpreted that the file has a characteristic of random access. When a database file is described as a keyword, it is interpreted that the file has a characteristic of random access.

In the process in step 603, the file characteristic determined by the above means is registered in the file i-node 702 as an extension attribute which is a characteristic flag 202. The above flow is the process flow of the file purpose interpreting unit.

Subsequently, the flow chart of processes performed by the storage device decision unit 132 will be described below with reference to FIG. 7.

In step 611, a file storage location device is decided on the basis of the characteristic flag 202 in the file i-node 702 and the information in the device characteristic holding unit 113. With respect to the device obtained as the decision result, a free region securing process of the device is executed by the free region securing unit 833 (FIG. 9).

When the free region is successfully secured in the process in the next step 612, the process of the storage device decision unit 132 is ended. When the free region securing unit 833 fails to secure the free region, the control flow returns to step 611 to decide whether the file should be written in another device or the processes are erroneously ended. The above processes are the processes of the storage device decision unit 132.

Figure 12:
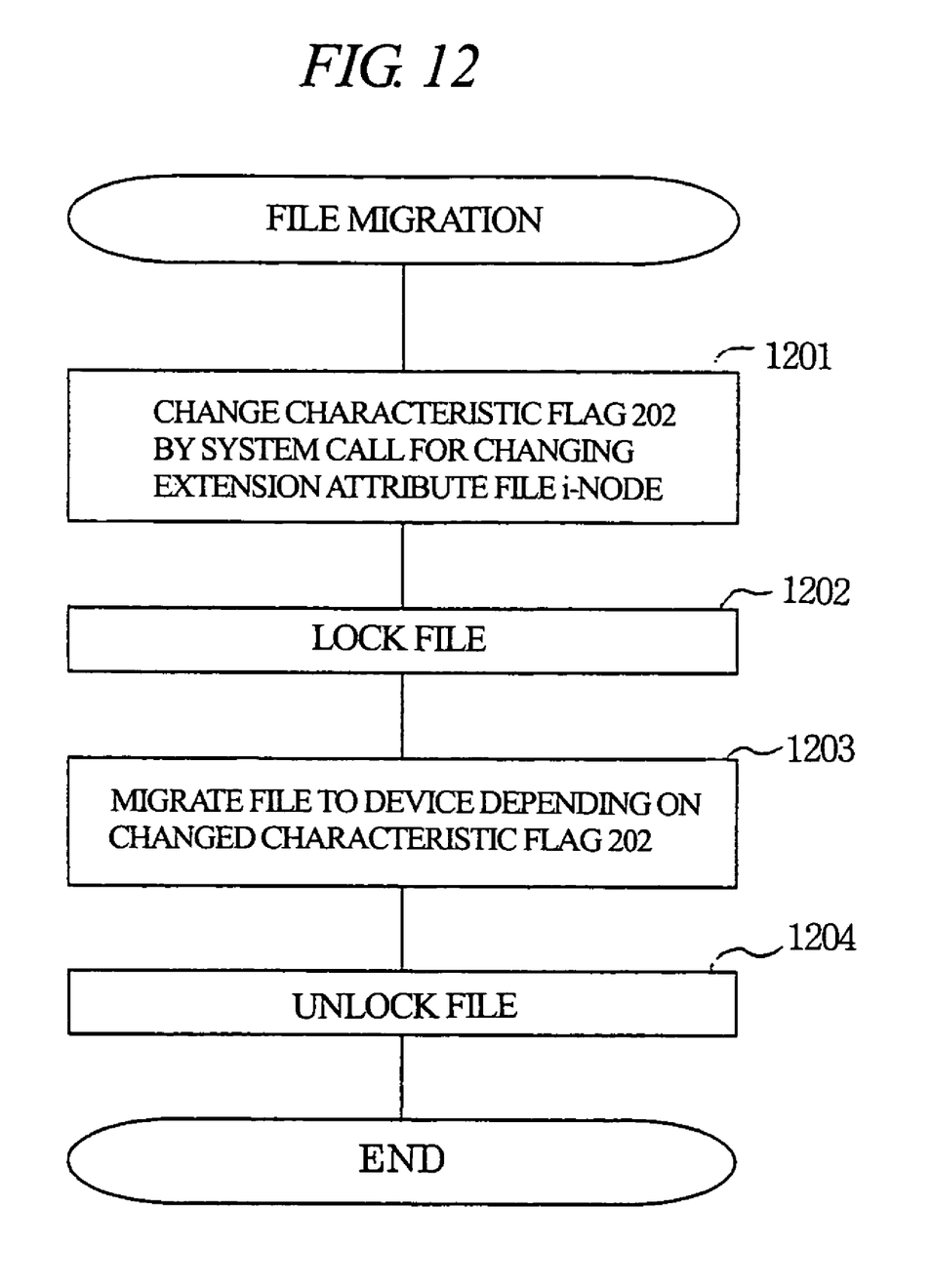
FIG. 12 is a flow chart showing a procedure of file migration in the embodiment.

File migration can also be performed by using the characteristic flag 202 in the file i-node 702. A method for performing the file migration will be described below.

In step 1201, a file operation such as a setxattr system call which changes the extension attribute of the file i-node is performed to change the characteristic flag 202.

In step 1202, the file is locked. In step 1203, the file is migrated in a device depending on the changed characteristic flag. Finally, the file is unlocked in step 1404. When the above file migration is performed, a file system view does not change.

In the embodiment, the pieces of information in the devices 102 and the device characteristic database 103 or interpretation reference data of a file purpose interpreting unit 111 and decision reference data of the storage device decision unit can be referred, changed, or additionally written.

In this manner, in the embodiment, file storage can be performed depending on purposes, and management cost can be reduced.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention is suitably applied to a technique which provides a plurality of devices having different characteristics as one file system in a storage system to reduce data management cost.

What is claimed is:

1. A storage system comprising:
    a plurality of physical devices having different device characteristics from one another; and
    a computer connected to and accessing the plurality of physical devices,
    wherein the computer forms, in a kernel space, a device driver to operate the plurality of physical devices, and at least one logical file system comprised of at least two of the plurality of physical devices, and
    wherein the logical file system includes:
        a device characteristic acquiring unit to acquire, through the device driver, each of the device characteristics regarding the types of the physical devices configuring the file system when a file system modifying operation of the file system is performed wherein the types of the physical devices include at least two of a device for sequential access, a device for random access, and a device for WORM (Write Once Read Many);
        a device characteristic holding unit to store the device characteristics for the respective physical devices obtained by the device characteristic acquiring unit;
        a file purpose interpreting unit to interpret a purpose and attribute of a file to register each device characteristic as a characteristic flag in file management information when a file operation for preparing the file management information of a file storing process is performed, wherein the purpose and attribute of the file includes information identifying an access type as being sequential, random, or WORM ('Write Once Read Many); and
        a storage device decision unit to decide and determine one of the physical devices for storing the file on the basis of the characteristic flag of the file management information and information from the device characteristic holding unit when a file operation for actually writing a file in the file storing process is performed,
    wherein the file system includes means for causing, when a file operation for preparing the file management information of the file storing process is performed, a user to designate a flag representing the device characteristic of the file as an argument of the file operation, and
    when the flag representing the device characteristic of the file is additionally written, the file purpose interpreting unit operates to register the flag representing the device characteristic of the file as a characteristic flag in the file management information without interpreting the purpose and attribute of the file.

2. A storage system according to claim 1, wherein the file system modifying operation includes at least one of formation, extension and mounting of the file system.

3. The storage system according to claim 1,
    wherein, when the device characteristic information is registered in a region which the physical devices can be referred to, the device driver includes device characteristic acquiring unit to acquire pieces of device characteristic information of the physical devices, and a device characteristic acquiring interface to receive characteristic information acquiring requests of the respective physical devices.

4. The storage system according to claim 3,
    wherein the device characteristic acquiring unit operates to request the device driver to acquire the pieces of device characteristic information for the respective physical devices by using the device characteristic acquiring interface to obtain the pieces of device characteristic information of the respective physical devices.

5. The storage system according to claim 3, further comprising a device characteristic database in which pieces of device characteristic information of general-purpose physical devices are registered, wherein the device characteristic acquiring unit inquires at the device characteristic database by using information for identifying a device to acquire a device characteristic.

6. The storage system according to claim 3,
    wherein, when the physical devices are a plurality of logical devices in a RAID apparatus connected to the computer, and when control of RAID caches is changed in units of logical devices, the device characteristic acquiring means include means for instructing the RAID apparatus to change the control of the RAID caches for the respective devices.

7. The storage system according to claim 3,
    wherein the device characteristic acquiring means includes means for issuing a plurality of access patterns to the device driver and for evaluating the characteristics for the respective physical devices by measuring response times for the access patterns.

8. The storage system according to claim 1,
    wherein the file system includes:
    means for locking, when the characteristic flag in the file management information is changed, the file and for migrating the file to a logical device according to contents of change of the characteristic flag; and
    an interface to refer to and to change the characteristic flag in the file management information.

* * * * *